Figure 1:
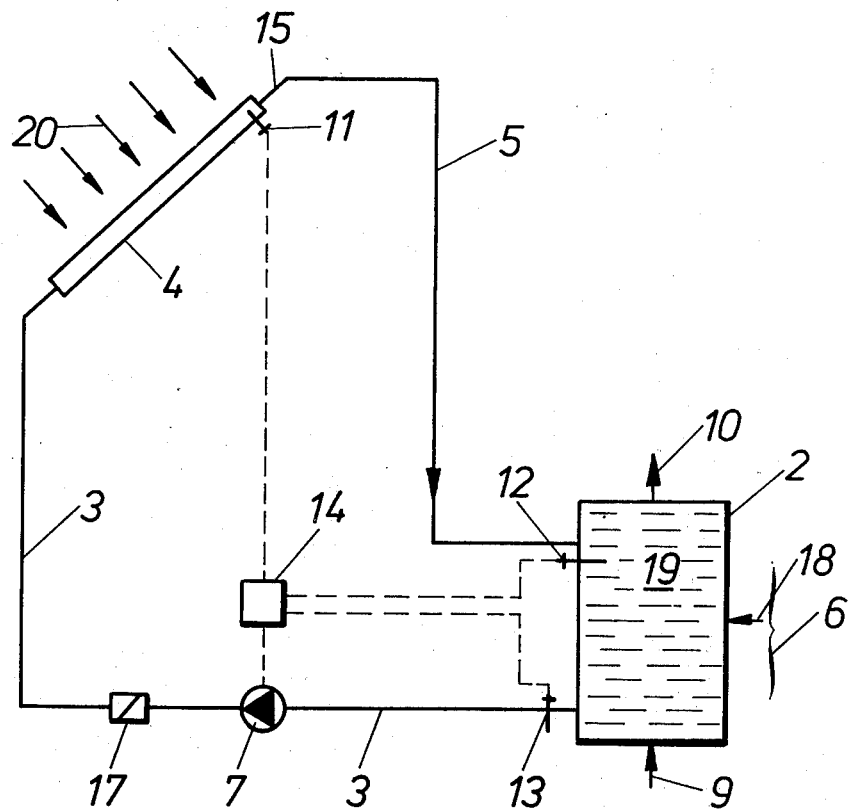

United States Patent [19]

Birnbreier

[11] 4,062,349
[45] Dec. 13, 1977

[54] METHOD FOR THE CONTROLLED HEATING OF A LIQUID RESERVOIR, AND RESERVOIR SYSTEM FOR CARRYING OUT THE METHOD

[75] Inventor: Hermann Birnbreier, Heidelberg, Germany

[73] Assignee: Brown, Boveri & Cie Aktiengesellschaft, Mannheim, Germany

[21] Appl. No.: 680,051

[22] Filed: Apr. 26, 1976

[30] Foreign Application Priority Data

Apr. 26, 1975  Germany ............................. 2518620

[51] Int. Cl.² ................................................. F24J 3/02
[52] U.S. Cl. ................................... 126/271; 237/1 A; 236/91 F
[58] Field of Search ................. 126/270, 271, 400; 237/1 A; 236/91 F

[56] References Cited

U.S. PATENT DOCUMENTS

| 2,553,302 | 5/1951 | Cornwall | 126/271 |
| 3,390,672 | 7/1968 | Snelling | 126/271 |
| 3,931,806 | 1/1976 | Hayes | 126/400 |
| 3,949,732 | 4/1976 | Reines | 126/271 |
| 3,977,601 | 8/1976 | Bearzi | 126/271 |
| 3,980,071 | 9/1976 | Barber, Jr. | 126/271 |

Primary Examiner—Kenneth W. Sprague
Attorney, Agent, or Firm—Herbert L. Lerner

[57] ABSTRACT

Method for the controlled heating of a liquid reservoir by a heat source of varying temperature wherein the heat from the heat source is fed through a heat carrier circuit to the reservoir into a region of a heating zone thereof which extends over part of the height of the reservoir and through which the heat carrier flows from the top to the bottom thereof, so that when heated stored liquid is withdrawn from the reservoir, colder liquid flows after it into the lower part of the reservoir, which comprises measuring and comparing the temperature of the heat carrier heated in the heat source and the temperature of the stored liquid in the region of the upper part of the heating zone, and initiating circulation of the heat carrier through the circuit only when the measured temperature of the heated heat carrier exceeds a temperature selected from the group of temperatures consisting of the measured temperature of the stored liquid and a pre-set limit temperature; and storage system for carrying out the foregoing method.

5 Claims, 2 Drawing Figures

U.S. Patent     Dec. 13, 1977     4,062,349

METHOD FOR THE CONTROLLED HEATING OF A LIQUID RESERVOIR, AND RESERVOIR SYSTEM FOR CARRYING OUT THE METHOD

The invention relates to a method for the controlled heating of a liquid reservoir by a heat source of varying temperature, such as solar collector or heater, the heat from the heat source being fed through a heat carrier circuit or circulatory loop to the reservoir in the region of a heating zone thereof, which extends over part of the reservoir height and through which the heat carrier flows from top to bottom, so that when heated stored liquid is withdrawn, colder liquid flows after it into the lower part of the reservoir. The invention also relates to a reservoir or storage system for carrying out the method.

If liquid reservoirs are to be heated by heat sources of varying temperature such as, solar collectors or wastewater currents, for example, there is the danger that the once-heated liquid will surrender its heat again to the heat source when the power or the temperature of the heat source is decreased. In such a case, the utilization of the heat source and the liquid reservoir would be poor.

It is accordingly an object of the invention to provide a method for controlled heating of a liquid reservoir, as well as a reservoir or storage system for carrying out the method, by means of which unintended heat removal from the liquid reservoir is prevented. In addition, the method and system are relatively simple and operationally reliable and require relatively low cost.

With the foregoing and other objects in view, there is provided in accordance with the invention, a method for controlled heating of a liquid reservoir by a heat source of varying temperature wherein the heat from the heat source is fed through a heat carrier circuit to the reservoir into a region of a heating zone thereof which extends over part of the height of the reservoir and through which the heat carrier flows from the top to the bottom thereof so that when heated stored liquid is withdrawn from the reservoir, colder liquid flows after it into the lower part of the reservoir, which comprises measuring and comparing the temperature of the heat carrier heated in the heat source and the temperature of the stored liquid in the region of the upper part of the heating zone, and initiating circulation of the heat carrier through the circuit only when the measured temperature of the heated heat carrier exceeds a temperature selected from the group of temperatures consisting of the measured temperature of the stored liquid and a pre-set limit temperature.

Since the heat carrier circulation is initiated or released only if the temperature of the heat carrier heated in the heat source is above the temperature of the liquid in the upper part of the heating zone, a backward or reverse discharge of the heat of the liquid reservoir through the heat source is prevented. By additionally releasing the heat carrier circulation at temperatures of the heat carrier above pre-set limit temperature, a result is achieved that cold reservoir liquid, which is in the lower part of the heating zone, is also heated up if the temperatures of the heated heat carrier i.e. the temperatures measured by the first temperature sensor, are lower than the liquid temperatures at the second temperature sensor. Furthermore, by releasing the heat carrier circulation above the limit temperature, a given extent of temperature limiting of the stored liquid to about the limit temperature is achieved. The heat carrier circulation will be maintained, if the content of the liquid reservoir has once been heated above the limit temperature, even when the power output or the temperature of the heat source drops below the prevailing temperature in the liquid reservoir. In this case, heat will continue to be withdrawn from the liquid reservoir and returned to the heat source until the limit temperature is reached and the heat carrier circulation is interrupted.

In accordance with another feature of the invention, the limit temperature corresponds approximately to the working temperature or temperature of use which is required for the operation or service of a consumer supplied by the liquid reservoir. Thereby, a simple matching of the storage temperature to the working temperature or temperature of use is achieved.

In accordance with a further feature of the invention, the method includes additionally measuring the temperature of the heat carrier as it leaves the heating zone and comparing it to the measured temperature of the heat carrier as heated in the heat source, and interrupting the circulation of the heat carrier through the circuit if the measured temperature of the heat carrier as it leaves the heating zone is higher than the measured temperature of the heat carrier flowing toward the heating zone from the heat source. In this relatively simple manner, heat withdrawal from the liquid reservoir is prevented.

In accordance with an added feature of the invention, the temperature of the heated heat carrier is measured before it leaves the heat source.

In accordance with the device of the invention, there is provided a storage system for carrying out the method for controlled heating of a liquid reservoir by a heat source of varying temperature comprising a heat carrier circuit including at least one heat source of varying temperature, advance and return lines connected to the heat source, and a heating zone extending over at least part of the height of a liquid reservoir, the heating zone being traversible in a direction from the top to the bottom thereof by heat carrier heated by the heat source whereby the heat carrier gives up at least part of its heat to stored liquid in the reservoir, cold liquid supply means connected to the liquid reservoir at the bottom thereof, heated liquid discharge means connected to the liquid reservoir at the top thereof, first temperature measuring means for measuring the temperature of the heat carrier as heated by the heat source, a second temperature measuring means for measuring the temperature of the stored liquid in the upper part of the heating zone, at least one circulation shut-off device connected in the heat carrier circuit and means connected to the first and second temperature measuring means and the circulation shut-off device for comparing the measured temperatures and means for opening the shut-off device only when the temperature measured by the first temperature measuring means is higher than a temperature selected from the group of temperatures consisting of the temperature measured by the second temperature measuring means and a preset limit temperature. Thus, a circulation shut-off device is inserted into the heat carrier circuit, which is operatively connected to the temperature sensors for control purposes. This provides a relatively simple construction of the control system of the invention at minimal cost.

In accordance with yet another feature of the invention, the storage system includes third temperature measuring means for measuring the temperature of the heat carrier at the bottom of the heating zone, the means for comparing the measured temperatures being also connected to the third temperature measuring means and the means for opening the shut-off device being actuable to close the circulation shut-off device when the temperature measured by the third temperature measuring means is higher than the temperature measured by the first temperature measuring means. Thereby, a backward or reverse discharge of the heat contained in the liquid reservoir is prevented without any great additional expense.

In accordance with a further feature of the invention, a control and temperature comparison device is inserted into the connection between the temperature sensors and the circulation shut-off device. In this manner, the comparison and control functions are combined into a control unit.

The storage liquid can be used simultaneously as heat carrier, but it is more advantageous and in accordance with another feature of the invention to include a heat exchanger connected in the heat carrier circuit and received in the reservoir whereby the heat carrier in the circuit is separated from the stored liquid in the reservoir. In this manner, mixing of the heat carrier and the storage liquid is reliably prevented, so that, for example, contamination of the one circuit cannot affect the other circuit.

In accordance with a concomitant feature of the invention, a circulating pump is connected into the heat carrier circuit and is employed simultaneously as the circulation shut-off device, the circulation being interrupted by shutting off the circulating pump. If in spite of this, the danger of thermally initiated circulation continues to exist, then a return flow inhibiting device, such as a check valve, is preferably provided, in addition, in the heat carrier circuit, the shut-off member of the return-flow inhibiting device opening only under the action of the pump flow.

Other features which are considered as characteristic for the invention are set forth in the appended claims.

Although the invention is illustrated and described herein as method for the controlled heating of a liquid reservoir, and reservoir system for carrying out the method, it is nevertheless not intended to be limited to the details shown, since various modifications may be made therein without departing from the spirit of the invention and within the scope and range of equivalents of the claims.

Figure 2:
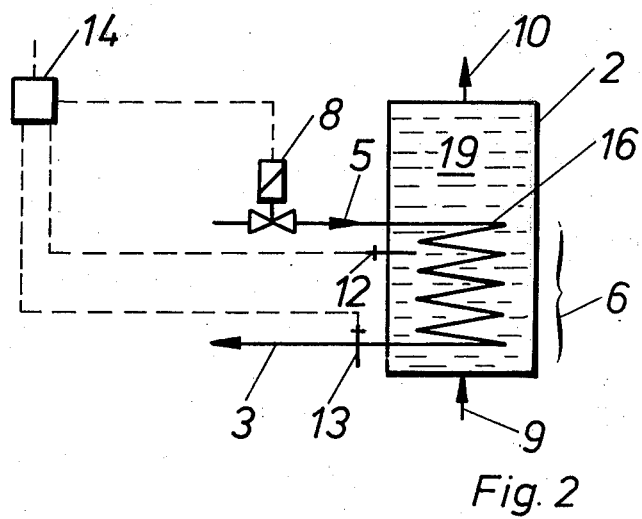

The invention, however, together with additional objects and advantages thereof will be best understood from the following description when read in connection with the accompanying drawings, in which:

FIG. 1 is a schematic view of a storage or reservoir system according to the invention, with an upright liquid reservoir and a solar collector as heat source of varying temperature, the reservoir or storage liquid being simultaneously employed as the heat carrier and being circulated by a circulation pump; and FIG. 2 is a schematic view of part of another embodiment of FIG. 1, with a shut-off valve provided as circulation shut-off in the heat carrier circuit and with a heat exchanger provided in the reservoir, the solar collector serving as heat source having been omitted from the figure.

Like parts are identified by the same reference numerals in both of the figures.

Referring now to the drawing, and first particularly to FIG. 1 thereof, there is shown therein a storage or reservoir system which has a heat source 4 of varying temperature in the form of a solar collector or heater. The variation of the temperature may be caused, for example, by changing output or power. At the upper end of the heat source, a lead or advance connection 15 is provided, to which a lead or advance line 5 is joined. The advance line 5 terminates in the upper region of an upright liquid reservoir 2 of preferably circular cross section, in communication with the interior storage or reservoir space 19. In the lower region of the storage space 19, a return line 3 is connected, leading to the heat source 4. Between the storage space 19 and the heat source 4, a circulating pump 7, as well as a return-flow inhibiting device in the form of a check valve 17 are connected into the return line 3. In the lower part of the liquid reservoir 2, a connection 9 for supplying cold storage liquid and, in the upper part thereof, a connection 10 for discharging warm storage liquid, are disposed. A heating zone 6 extends in vertical direction between the connections of advance line 5 and the return line 3 at the reservoir. The lower limit of the heating zone 6 is preferably located in the lower region of the storage space 19 and extends, for example, up to about one-half the height of the storage space 19 i.e. up to the level of the arrow 18.

A first temperature sensor 11 of conventional construction, is provided in the heat source 4 in the vicinity of the advance line connection 15; a similar second temperature sensor 12 is located in the upper part of the heating zone 6 of the reservoir 2; and a third similar temperature sensor 13 is optionally provided in the return line 3, in the vicinity of the reservoir 2. The heat sensors 11, 12 and 13 are connected to a control and temperature comparison device 14, of suitable conventional construction, readily within the knowledge of a man of ordinary skill in the art, a circulating pump 7 being further connected to the temperature comparator and control device 14.

In the present embodiment of FIG. 1, the storage liquid present in the storage space 19 is employed as heat carrier and is conducted in a circuit or circulatory loop through the heat source 4. In the illustrated embodiment ordinary tap water or drinking water is used as the storage liquid, but it is obvious that other liquids can also be used, such as heating water or the like.

The heat carrier flowing through the aforementioned parts 2, 3, 7, 17, 4 and 5 can flow only if the temperature at the first temperature sensor 11 is higher than the temperature at the second temperature sensor 12, or if the temperature at the first temperature sensor 11 is higher than a predetermined or pre-set limit temperature. However, the circulation is additionally interrupted, if the temperature at the temperature sensor 13 is equal to or higher than the temperature at the temperature sensor 11 i.e. if the heat carrier in the liquid reservoir 2 does not cool down or, in fact, is heated up. The temperature comparison and the individual switching operations are performed by the conventional temperature comparison and control device 14, which acts on the circulating pump 7 and, in fact, so that the circulating pump 7 is shut off to interrupt the circulation and is placed again in operation to resume the circulation. In order to prevent thermally initiated continuation of the heat-carrier circulation when the circulating pump 7 is shut off, a check valve 17 is further provided on the pressure side of the circulating pump 7, the check valve 17 opening only when acted upon by the pump pressure, but preventing thermally initiated circulation.

The operation of the system takes place as follows: If the storage space 19 is filled with cold liquid and the heat source 4 in the form of a solar collector or heater is heated by the sun's rays 20, then the circulating pump 7 is switched on by the control and temperature comparison device 14 if the temperature of the first temperature sensor 11 is higher than the temperature of the second sensor 12. The heat from the solar heater or collector 4 is transported to the liquid reservoir 2 by means of the heat carrier which is conducted in the circulatory loop. If the content of the reservoir or storage 2 is charged i.e. heated up to temperature equilibrium between the sensors 11 and 12, then the circulating pump 7 is taken out of service by means of the temperature comparison and control device 14 and the circulation is thus interrupted. The same would occur if, during the charging process, the sun's radiation 20 would be reduced and the temperature at the first temperature sensor 11 would drop.

If heated storage liquid is withdrawn from the reservoir 2 through the connection 10, then cold liquid flows in thereafter from below through the connection 9 and forms a stratum below the heated liquid. If, in this process, the boundary layer between the warm and the cold storage liquid is located below the level of the second temperature sensor 12, and if the temperatures at the temperature sensors 11 and 12 are equal, then the heating of the storage liquid would be interrupted, regardless of the magnitude of the temperatures. Even at very high temperatures, the heat carrier circulation would not be activated if it were not provided for that, at temperatures above a limit temperature, the circulation of the heat carrier would be started. The limit temperature corresponds preferably to the temperature of use which is required by the consumer connected to the liquid reservoir 2.

This circuit may also be used to lower the storage temperature. With this circuit, a given upper limitation of the storage temperature to the temperature of use is achieved, since the once-started circulation of the heat carrier is maintained until the temperature thereof has dropped below the limit temperature. This means that, in the case of limited heat production at the heat source, heat is withdrawn from the stored liquid and is returned to the heat source, as long as the temperature is below the limit temperature and the circulation is interrupted.

Limiting of the storage temperature in this way is advantageous, particularly if no heated liquid is taken from the liquid reservoir for an extended period of time e.g. for days or weeks. The heat absorbed by the solar collector and stored during the day, is again surrendered by the solar collector to the ambient air during the night or at the times when the sun's radiation is low until the limit temperature is reached. This means that temperatures which occur in the liquid reservoir during the day and are above the limit temperature, are reduced, for example, during the night or at the times when the sun's radiation is low. If an upward limitation of the temperatures is not desired, then the third temperature sensor 13 is provided, which prevents reverse discharge. This third temperature sensor 13 is preferably selectively connectible, so that operation of the system with or without upward temperature limitation can be selected, for example, by operating a switch.

In FIG. 2, another embodiment or variant of FIG. 1 is shown, but the heat source, circulating pump and check valve have been omitted from the figure. The differences in FIG. 2 over the structure of FIG. 1 are that in the advance line 5, a shut-off valve 8, in the form of a magnetic valve, is connected to the control and temperature comparison device 14 for interrupting the heat carrier circulation; the heat carrier circulatory loop extends through a heat exchanger 16 provided in the heating zone 6, so that the heat carrier cannot mix with the storage liquid. Consumer water i.e. tap or drinking water, can thereby be used, as the storage liquid, and an antifreeze liquid as the heat carrier, so that there is no danger that the solar collector or heater will freeze, even during winter operation.

The operation of the system according to FIG. 2 corresponds in the same sense to the description of operation presented hereinbefore in connection with the embodiment of FIG. 1, so that further description is believed to be unnecessary.

There is claimed:

1. In a method for controlled heating of a liquid reservoir by a heat source of varying temperature wherein the heat from the heat source is fed through a heat carrier circuit to the reservoir into a region of a heating zone thereof which extends over part of the height of the reservoir and through which the heat carrier flows from the top to the bottom thereof, so that when heated stored liquid is withdrawn from the reservoir, colder liquid flows after it into the reservoir, the temperature of the heat carrier heated in the heat source and the temperature of the stored liquid in the region of the upper part of the heating zone being measured and compared, and circulation of the heat carrier through the circuit being initiated only when the measured temperature of the heated heat carrier exceeds the measured temperature of the stored liquid, the improvement therein which comprises introducing the colder liquid into the lower part of the reservoir, when the heated stored liquid is withdrawn from the reservoir, and forming a stratum of the colder liquid below the heated stored liquid remaining in the reservoir, and measuring the temperature of the stored liquid exclusively in the region of the upper part of the heating zone and then additionally initiating the circulation of the heat carrier through the circuit when the measured temperature of the heated heat carrier exceeds a pre-set limit temperature corresponding substantially to a temperature of use required by a consumer supplied by the liquid reservoir.

2. Method according to claim 1 which includes additionally measuring the temperature of the heat carrier as it leaves the heating zone and comparing it to the measured temperature of the heat carrier as heated in the heat source, and interrupting the circulation of the heat carrier through the circuit if the measured temperature of the heat carrier as it leaves the heating zone is higher than the measured temperature of the heat carrier flowing toward the heating zone from the heat source.

3. In a storage system having at least one liquid reservoir and a heat source of varying temperature connected by advance and return lines into a heat carrier circuit, a heating zone extending over at least part of the height of the liquid reservoir, the heating zone being traversible in a direction from the top to the bottom thereof by heat carrier heated by the heat source whereby the heat carrier gives up at least part of its heat to stored liquid in the reservoir, cold liquid supply means connected to the liquid reservoir, heated liquid discharge means connected to the liquid reservoir at the top thereof, first temperature measuring means located in vicinity of the connection of the advance line to the heat source for measuring the temperature of the heat carrier as heated by the heat source, a second temperature measuring means located in the liquid reservoir for measuring the temperature of the stored liquid, at least one circulation shut-off device connected in the heat carrier circuit, and comparison means connected to the first and second temperature measuring means and the circulation shut-off device for comparing the measured temperatures and control means for opening the shut-off device when the temperature of the heated heat carrier in the heat source measured by the first temperature measuring means is higher than the temperature of the liquid in the reservoir measured by the second temperature measuring means, the improvement therein comprising: the connection for the cold liquid supply means being located at the bottom of the liquid reservoir, and the second temperature measuring means being located in the upper part of the heating zone of the liquid reservoir, and the shut-off device being openable by the control means when the temperature of the heated heat carrier in the heat source measured by the first temperature measuring means exceeds a pre-set limit temperature corresponding substantially to a temperature of use required by a consumer supplied by the liquid reservoir.

4. Storage system according to claim 3 including third temperature measuring means for measuring the temperature of the heat carrier at the bottom of said heating zone, said means for comparing the measured temperatures being also connected to said third temperature measuring means, and said means for opening said shut-off device being actuatable to close said circulation shut-off device when the temperature measured by said third temperature measuring means is higher than the temperature measured by said first temperature measuring means.

5. Storage system according to claim 3 wherein said means for comparing the measured temperatures and said means for opening said shut-off device being combined into a comparison and control device connected between said temperature sensors and said circulation shut-off device.

* * * * *